United States Patent [19]

Oleson et al.

[11] Patent Number: 5,568,960
[45] Date of Patent: Oct. 29, 1996

[54] AIRCRAFT PASSENGER SEAT SWIVEL ASSEMBLY

[75] Inventors: Michael Oleson; Daryl Soderman, both of Ft. Lauderdale, Fla.

[73] Assignee: Aircraft Modular Products, Inc., Miami, Fla.

[21] Appl. No.: 529,084

[22] Filed: Sep. 15, 1995

[51] Int. Cl.$^6$ .................................................. B60N 2/14
[52] U.S. Cl. .............................. 297/344.22; 297/344.26; 248/418; 248/425
[58] Field of Search .................... 297/344.21, 344.22, 297/344.26, 256.12, 240; 248/418, 425

[56] References Cited

U.S. PATENT DOCUMENTS

| | | | |
|---|---|---|---|
| 3,338,622 | 8/1967 | Bachmann | 297/344.26 X |
| 3,622,202 | 11/1971 | Brown | 297/344.22 X |
| 4,705,256 | 11/1987 | Hofrichter | 297/344.22 X |
| 4,971,392 | 11/1990 | Young | 297/344.26 X |
| 5,482,354 | 1/1996 | Gryp | 297/344.22 |

*Primary Examiner*—Peter R. Brown
*Attorney, Agent, or Firm*—Malloy & Malloy, P.A.

[57] ABSTRACT

An aircraft passenger seat swivel assembly to be connected between an aircraft seat frame upon which an individual sits and an aircraft seat base which is secured to an underlying support surface, the assembly including a bottom swivel plate with a generally annular recess formed therein and structured to receive a bearing track with a plurality of slots disposed about a perimeter thereof and structured to receive a plurality of bearing members therein. The swivel assembly further including a swivel plate with an exterior segment structured to ride on the bearing members disposed in the bearing track and an interior mount segment upon which the aircraft frame is mounted, the exterior segment of the swivel plate being rotatably retained in place by a lock ring which is secured to the bottom swivel plate and has an annular lock recess to retain the exterior segment of the swivel plate, the bearing track, and the plurality of bearing members in the annular recess of the bottom swivel plate. Additionally, the lock ring includes a plurality of axially oriented notches along an interior perimeter thereof, the notches being structured to receive a lock pin which is secured to the swivel plate and is structured to extend axially outward into the axial notch of the lock ring to prevent relative rotation between the seat frame and the seat base.

5 Claims, 3 Drawing Sheets

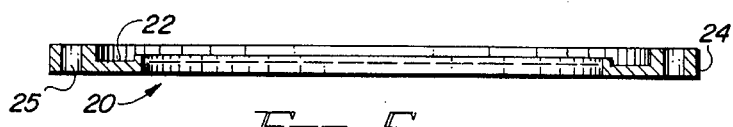
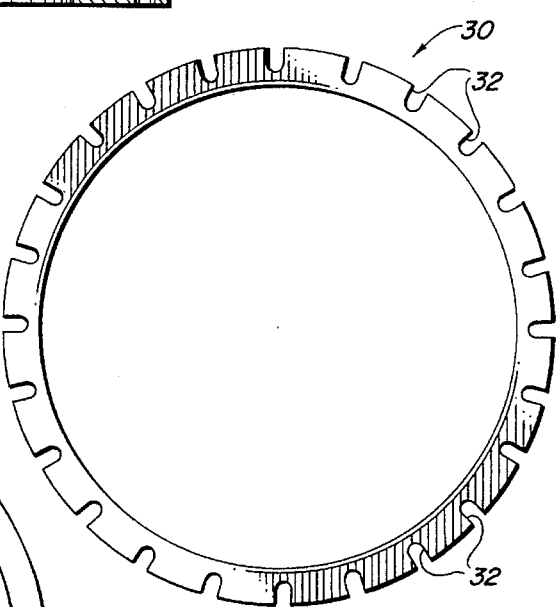
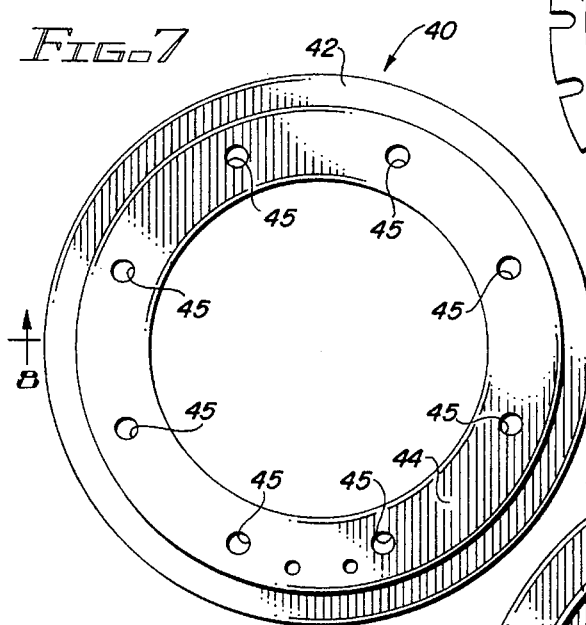
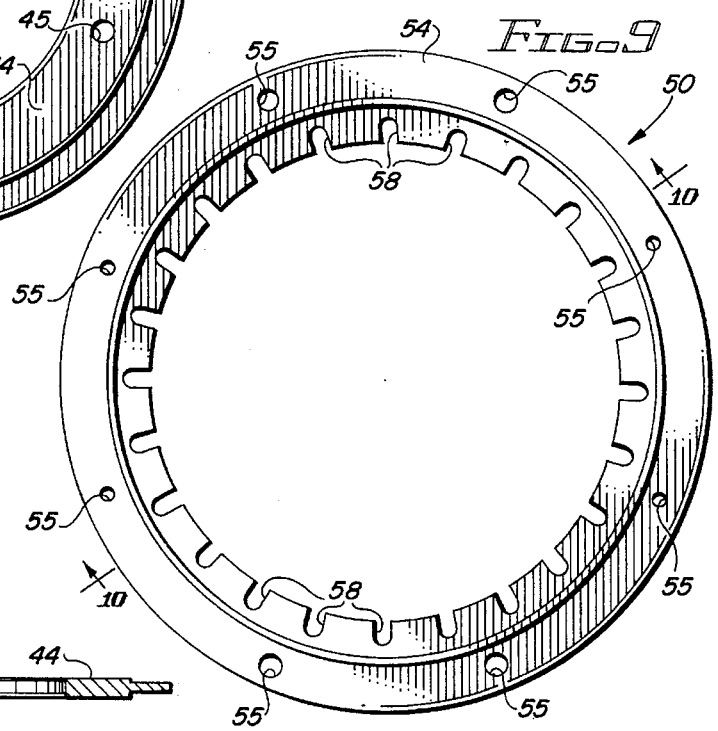
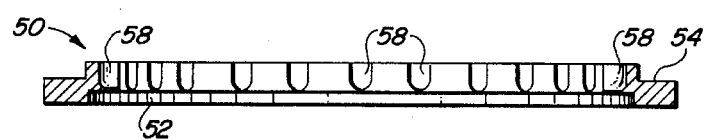

AIRCRAFT PASSENGER SEAT SWIVEL ASSEMBLY

BACKGROUND OF THE INVENTION

1. Field of the Invention

The present invention relates to an aircraft passenger seat swivel assembly to be mounted between an aircraft seat frame and aircraft seat base so as to permit rotation of the aircraft passenger seat when desired, relative to the aircraft seat frame. The swivel assembly also provides a strong, tightly secured, locked engagement therebetween when relative movement of the aircraft passenger seat is not desired.

2. Desciption of the Related Art

The Federal Aviation Administration (FAA) has established very strict regulations for the structures of all aircraft as well as aircraft components, including aircraft passenger seats. Aircraft passenger seats in particular are subjected to a number of different FAA tests designed to assure the aircraft seat will be reasonably safe in a crash scenario, and these tests frequently expose weakness in the structural makeup of the aircraft seat. Because the passenger seats on commercial aircraft are quite basic and contain minimal comfort features, these are not affected by all of the FAA tests for aircraft passenger seats. However, the owners of many private aircraft often specify that passenger seats have additional comfort features such as the ability to swivel and slide. Thus, the field of constructing customized aircraft passenger seats is quite specialized, and is particularly affected by the number and type of tests as prescribed by the Federal Aviation Administration (FAA) to regulate the integrity of aircraft passenger seats. Such field of art is particularly specialized as it relates to custom aircraft seating because of the many additional features often desired in the custom seating.

One feature often requested in customized aircraft passenger seats is the ability to swivel the seat so that it rotates relative to the base. The base of the seat is in turn fixedly secured to the underlying support surface, usually the floor of the aircraft. Although some conventional chairs are built to swivel, that feature is particularly specialized with regard to aircraft seating because in addition to being able to swivel smoothly and comfortably, the seat must also be able to be secured and maintained in place so as to withstand substantial impact forces. Specifically, the swivel assembly of an aircraft seat must undergo certain tests mandated by the FAA and must withstand substantial impact forces during such tests; for which the levels of such tests have recently been increased by the FAA. These recent, very high FAA testing standards are just now beginning to affect the seat manufacturing industry, and consequently the choices available to the consumers of customized aircraft seats, including the swivel assembly for them.

Presently in the art, conventional swivel assemblies for aircraft passenger seats mount the seat frame on a round or ring-shaped platform which has a number of notches formed in and about its exterior perimeter. For such assemblies, a separate lock mechanism is included which is mounted to the seat frame and is used to secure the seat frame in place. In this design, the lock mechanism employed generally incorporates a pin disposed at an end of a biased lever arm which is positioned tangent to the round platform. When disengaged, the lever arm is pulled against its normal bias to release the pin from an engaged orientation. When, however, locking is desired and the lever arm is released, the normal biasing action of the lever arm urges the pin towards the platform until the pin slides into a corresponding notch in the platform. Because the pin is disposed on the free end of a lever arm, the pin will naturally move in a generally arcuate path towards the platform. In fact, existing swivel mechanisms position the notches about the exterior perimeter at 5 degree angles rather than directly along a radius of the platform so as to permit appropriate engagement of the lock pin therein. Unfortunately, the arcuate path of travel of the lock pin, and the necessary angled notches in the exterior perimeter of the round platform make the assemblies of the prior art substantially susceptible to disengagement at high loads. Specifically, under the new FAA test requirements, the aircraft seat is subjected to substantially higher loads in order to test the effectiveness of the engagement between the lock pin and the notch. Because of the angled orientation of the notches and the round lock pin, however, the substantial load exerted on the seat tends to urge the pin out of the notch and does not focus all of the load directly on the material construction of the pin. As such, conventional swivel designs are generally not meeting the new FAA requirements and an improved design is necessary.

Further, most conventional swivel assemblies use nylon or like material runners as a swivel surface. Such types of runners, however, do not provide for smooth motion and are susceptible to rips or rapid wear. Accordingly, such designs are often deemed undesirable because of the difficulty and expense associated with installing a replacement runner, and because of the increased friction in the swivel.

There is therefore substantial need in the related and specialized art for a swivel assembly for use in an aircraft seat which is capable of withstanding the substantial loads associated with FAA testing guidelines without premature disengagement of the assembly from a locked position. There is also a need in the art for a swivel assembly which provides for smooth and convenient swivel movement when swiveling is desired. The assembly of the present invention solves these problems.

SUMMARY OF THE INVENTION

The present invention is directed towards an aircraft passenger seat swivel assembly to be connected between an aircraft seat frame, upon which an individual sits, and an aircraft seat base, which is secured to an underlying support surface. The swivel assembly of the present invention includes a top swivel plate having an exterior lock flange and a generally annular recess formed therein. Additionally, the swivel plate is specifically structured to be secured to the seat base, thereby remaining rigidly disposed relative thereto.

Positioned in the annular recess of the bottom swivel plate is a bearing track. The bearing track has a generally annular configuration and includes a plurality of slots disposed about a perimeter thereof. Those slots are structured to receive a plurality of bearing members rotatably therein.

Additionally, the swivel assembly includes a swivel plate. The swivel plate has a generally annular configuration and includes an exterior segment, disposed about an exterior perimeter of the swivel plate, and an interior mount segment in an interior of the swivel plate. Specifically, the exterior segment of the swivel plate is structured to ride on the bearing members that are disposed in the slots of the bearing track. Accordingly, the swivel plate can rotate relative to the bottom swivel plate. Further, the interior mount segment of the swivel plate is structured to supportingly receive the aircraft seat frame thereon, such that movement thereof results in corresponding movement of the aircraft seat frame.

Disposed on the top part of the swivel assembly is a lock ring. The lock ring includes an annular lock recess and an exterior lock flange. The exterior lock flange of the lock ring is specifically structured to be secured with the exterior lock flange of the bottom swivel plate, so that the annular lock recess is disposed over the exterior segment of the swivel plate. As such, the exterior segment of the swivel plate is rotatably retained between the annular recess of the bottom swivel plate and the annular lock recess of the top lock ring.

The lock ring also includes a plurality of axially oriented notches disposed in spaced apart relation from one another along an interior perimeter of the lock ring. The axial notches is are structured to receive therein an axially extending lock pin of a lock means of the swivel assembly. In particular, the lock means are structured to selectively and axially extend the lock pin into a select one of the notches so as to retain the swivel plate non-rotatably disposed relative to the lock ring, the bottom plate, and accordingly the seat base.

It is an object of the present invention to provide an aircraft seat swivel assembly which is substantially resistant to disengagement from a locked orientation.

Still another object of the present invention is to provide a swivel assembly which enables and facilitates smooth swivelling between a seat frame and seat base, as well as strong, tight securing in a locked orientation.

Yet another object of the present invention is to provide an aircraft seat swivel assembly capable of withstanding a load exerted thereon in accordance with FAA testing guidelines without moving from a locked orientation.

An additional object of the present invention is to provide an aircraft seat swivel assembly which provides for smooth, minimal friction swivel movement when activated.

BRIEF DESCRIPTION OF THE DRAWINGS

For a fuller understanding of the nature of the present invention, reference should be made to the following detailed description taken in connection with the accompanying drawings in which:

FIG. 5 is a cross-sectional view of the bottom swivel plate of the present invention along line 5—5 of FIG. 4.

FIG. 6 is a top plan view of the bearing track of the present invention.

FIG. 7 is a top plan view of the swivel plate of the present invention.

FIG. 8 is a cross-sectional view of the swivel plate of the present invention along line 8—8 of FIG. 7.

FIG. 9 is a top plan view of the lock ring of the present invention.

FIG. 10 is a cross-sectional of the lock ring of the present invention along line 10—10 of FIG. 9.

Like reference numerals refer to like parts throughout the several views of the drawings.

DETAILED DESCRIPTION OF THE PREFERRED EMBODIMENT

Figure 1:
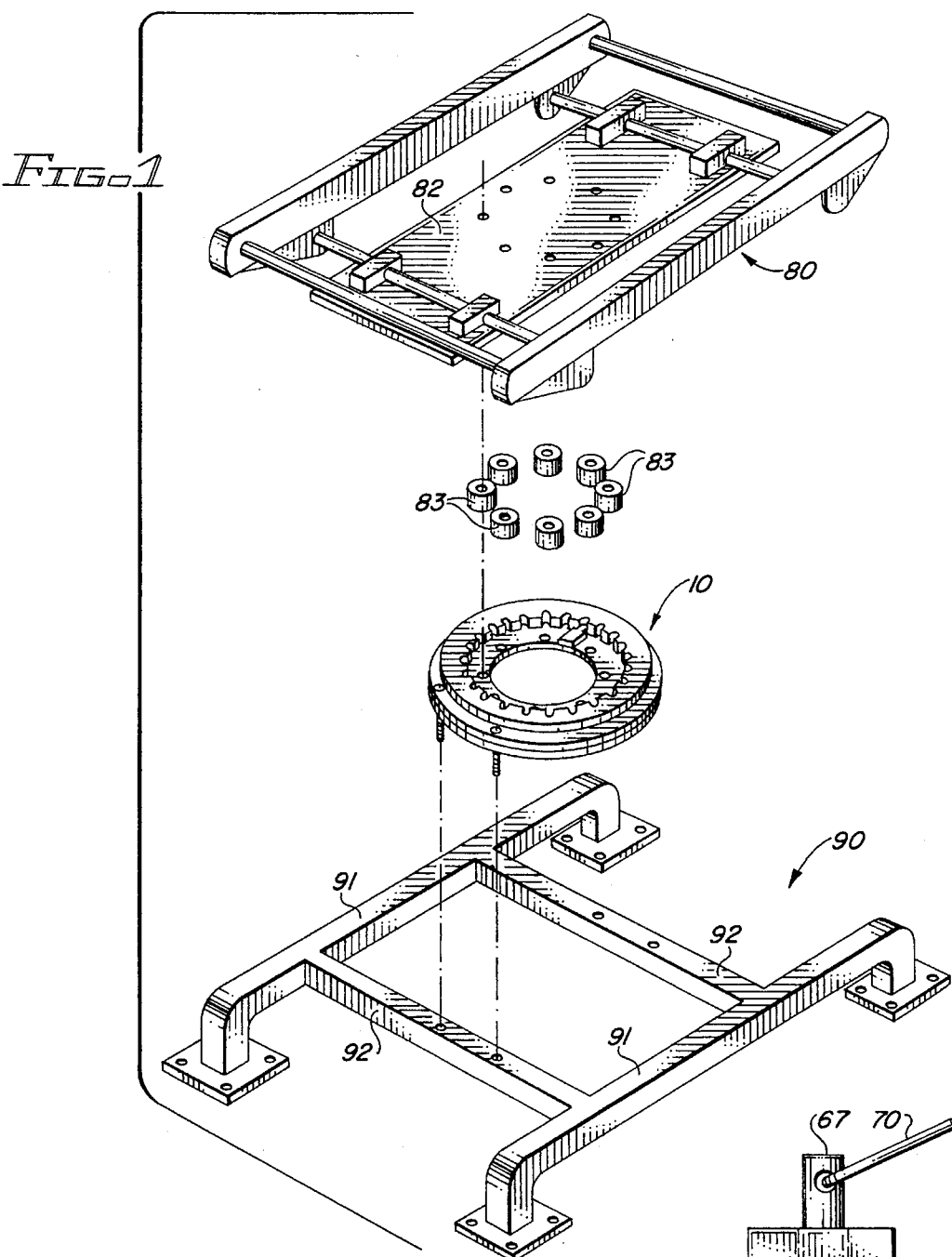
FIG. 1 a partially exploded, perspective view of the swivel assembly of the present invention.

Shown throughout the several views of the drawings, the present invention is directed towards an aircraft passenger seat swivel assembly, generally indicated as 10. The swivel assembly 10 is preferably structured to be connected between an aircraft seat frame 80, upon which an individual sits, and an aircraft seat base 90, which is secured to an underlying support surface. Further, the aircraft seat base 90 will preferably include a pair of spaced base rails 91 between which a pair of transverse spar segments 92 are mounted.

Figure 3:
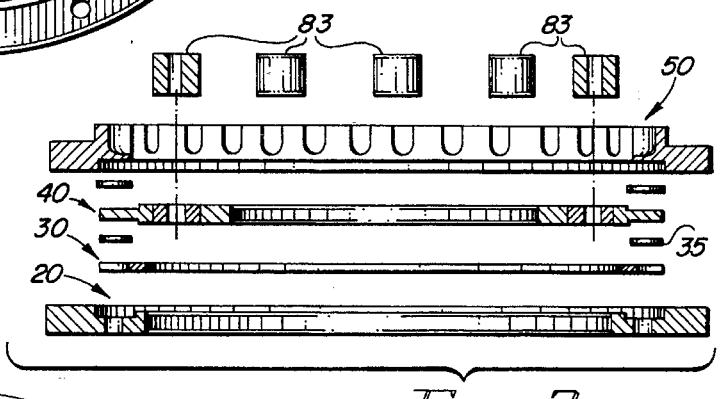
FIGS. 3 is a partially exploded cross-section view along line 3—3 of FIG. 2.
Figure 4:
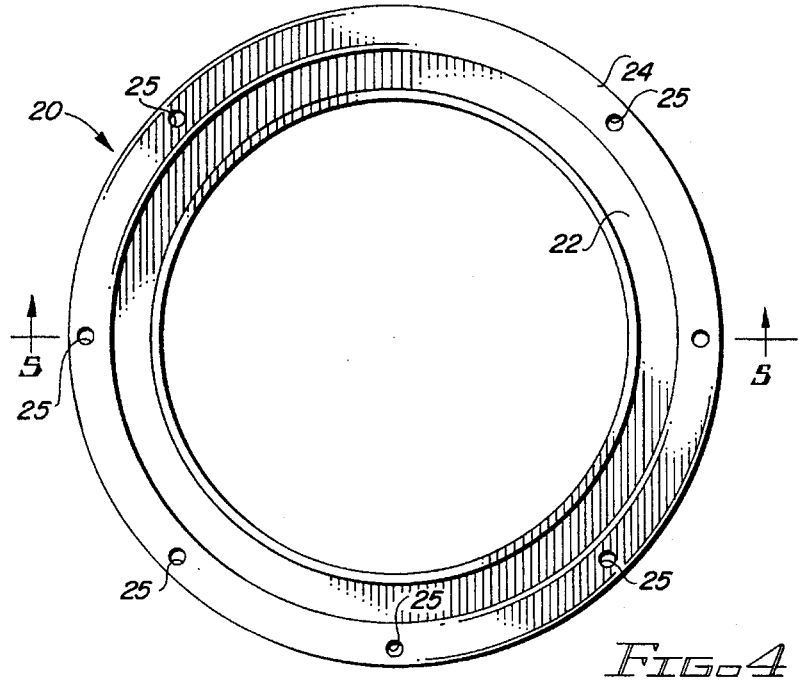
FIG. 4 is a top plan view of the bottom swivel plate of the present invention.

Turning specifically to the swivel assembly 10 of the present invention, it includes a bottom swivel plate 20, seen in FIGS. 3, 4 and 5. The bottom swivel plate 20 includes primarily a generally annular recess 22 formed therein and an exterior lock flange 24, and preferably has a ring type configuration. Further, the bottom swivel plate 20, preferably at its exterior lock flange 24 and through a number of spaced apertures 25 disposed about a perimeter thereof, is secured either directly or indirectly to the spar segments 92 of the seat base 90. Accordingly, the bottom swivel plate 20 remains rigidly and fixedly disposed relative to the underlying support surface to which the seat base 90 is mounted. Turning to the annular recess 22 formed in the bottom swivel plate 20, it preferably has a grooved configuration and extends entirely along an interior perimeter of the bottom swivel plate.

Figure 6A:
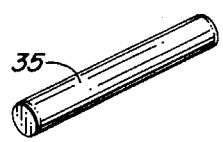
FIG. 6A is an isolated perspective view of one of the bearing members of the present invention.

Structured to be disposed in the annular recess 22 of the bottom swivel 20 is a bearing track 30, illustrated in FIGS. 3 and 6. The bearing track 30 also preferably has a ring or generally annular configuration and is structured to fit completely within the annular recess 22 of the bottom swivel 20. Further, the bearing track 30 includes a plurality of slots 32 disposed about a perimeter thereof. The slots 32 are preferably a series of generally U-shaped cut-outs 32 that extend entirely through a height of the bearing track 30. Additionally, a plurality of bearing members 35 are structured to be disposed, preferably in each one of the slots 32, which as explained are disposed about the perimeter of the bearing track 30 and act to maintain the bearing members 35 in spaced apart relation from one another. These bearing members 35 may be ball bearings or preferably cylindrical bearing members 35, which are positioned in the slots 32 and are structured to freely rotate therein.

The swivel assembly 10 of the present invention also includes a swivel plate 40, illustrated in FIGS. 2–3 and 7–8. The swivel plate 40 includes a generally annular or ring-like configuration and includes an exterior segment 42, seen in FIG. 8, about an exterior perimeter thereof, and an interior mount segment 44 about an interior thereof. Looking to the exterior segment 42 of the swivel plate 40, it preferably includes a reduced thickness, as illustrated in the drawings, and is structured to ride on the bearing members 35 disposed in the slots 32 of the bearing track 30 which rests in the annular recess 22 of the bearing track 30. As such, the swivel plate 40 will preferably freely and easily rotate atop the bearing members 35 and relative to the bearing track 30. The interior mount segment 44 of the swivel plate 40, which can include a number of inwardly extending segments, preferably includes an entire annular segment 44 which extends the entire interior perimeter of the swivel plate 40. Additionally, the interior mount segment 44 is specifically structured to supportingly receive the aircraft seat frame 80 thereon. In particular, the interior mount segment 44 includes a number of openings 45 therein to which the seat frame 80 is secured. Because most designs of seat frames 80 in custom, private aircraft are structured to slide in addition to swivel, most such seat frame 80 designs include a slider plate 82 (seen in FIG. 1) upon which the supports of the seat frame 80 are mounted. As such, the slider plate 82 is mounted directly to the interior mount segment 44, also preferably utilizing a number of spacer elements 83 to maintain proper clearance, thereby enabling the seat frame 80 to rotate in accordance with the rotation of the swivel plate 40.

Disposed preferably atop the bottom swivel plate 20 is a lock ring 50, illustrated in FIGS. 2–3 and 9–10. This lock ring 50 also includes an annular lock recess 52, best seen in FIG. 10, and an exterior lock flange 54. Preferably, the exterior lock flange 54 of the lock ring 50 is structured to be disposed in overlying relation atop the exterior lock flange 24 of the bottom swivel plate 20, such as through a number of apertures 55 disposed in the exterior lock flange 54 of the lock ring 50. As such, the lock ring 50 is immovably secured relative to the bottom swivel plate 20. Additionally, the lock ring 50 is disposed such that the annular lock recess 52 is disposed in overlying relation atop the exterior segment 42 of the swivel plate 40. Specifically, in the preferred embodiment as illustrated in the drawings, the annular lock recess 52 includes an indented portion formed in the generally ring like, annular configuration of the lock ring 50 which extends about an inner perimeter of the lock ring 50. As such, the exterior segment 42 of the swivel plate 40 is essentially sandwiched between the annular lock recess 52 of the lock ring 50 and the bearing track 30 and bearing members 35 disposed in the annular recess 22 of the bottom swivel plate 20. The swivel plate 40 is therefore is able to freely rotate relative to the bottom swivel plate 20 and lock ring 50 without becoming dislodged. Further, the lock ring 50 preferably has the ring type configuration such that the interior mount segment 44 of the swivel plate 40 is exposed therethrough for mounting to the seat frame portion 80.

Figure 11:
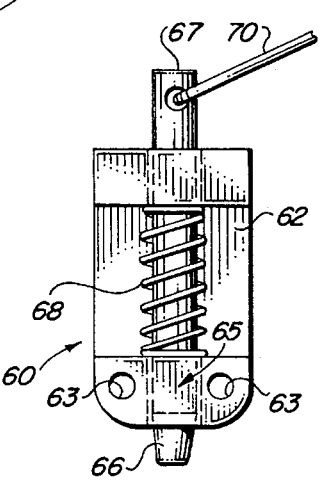
FIG. 11 is a top plan view of the lock means of the present invention.
Figure 2:
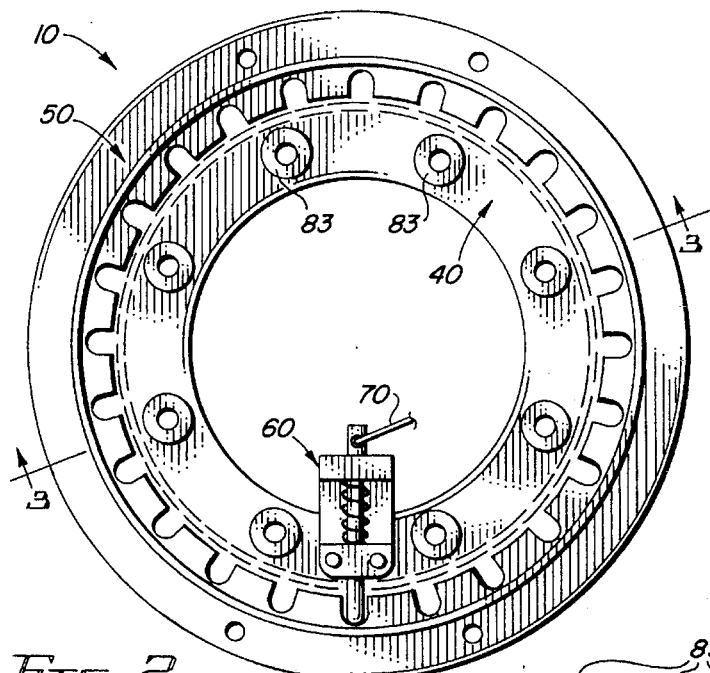
FIG. 2 is a top plan view of the swivel assembly of the present invention.

So as to maintain the swivel plate 40 in one of a plurality of orientations relative to the bottom swivel plate 20 and lock ring 50, lock means 60 are included, as illustrated in Figure 11. The lock means 60 are specifically structured to prevent rotation of the seat frame 80 relative to the seat base portion 90. The lock means 60 are especially significant in that the lock means must withstand substantial impact forces or loads on the seat frame 80, which normally tend to cause relative rotation thereof, during real or simulated crash situations. To overcome this, the swivel assembly of this invention includes a lock pin 65 as part of the lock means 60. This lock pin 65 is structured to extend into one of a plurality of notches 58 formed about an interior perimeter of the lock ring 50. Specifically, the lock ring 50 includes a number of preferably U-shaped notches 58 formed therein about an interior perimeter thereof. Further, each of these notches are radially oriented so as to be axially aligned along a radius of the lock ring 50. Further, each of the notches 58 in the lock ring 50, are fitted so as to substantially receive a distal end 66 of the lock pin 65 radially therein. In particular, the lock means 60 will preferably include a lock plate 62 which is mounted, preferably through a pair of apertures 63 formed therein, to the interior mount segment 44 of the swivel plate 40. Disposed on this lock plate 62 is the lock pin 65. Additionally, the lock pin 65 is disposed so as to be axially aligned along a radius of the swivel plate 40 and accordingly the lock ring 50. As such, the lock pin 65 is structured to move radially inward and outward into an engaged position and an unengaged position. In the preferred embodiment, the lock means 60 will include a spring 68 or other biasing means, which will normally bias the lock pin 65 into an engaged orientation wherein the distal lock end 66 is firmly disposed within one of the notches 58 of the lock ring 50. Also in the preferred embodiment control means are included, preferably in the form of a control wire 70 secured to a rear end 67 of the lock pin 65. The control wire 70 is connected to a switch or other type of control mechanism such that when an individual wishes to swivel the seat frame 80 relative to the seat base 90, they must merely actuate a control to result in the pulling of the control wire 70 and hence force the retraction of the lock pin 65 from its engaged position. Once the seat frame has been swiveled to a desired orientation, the control wire 70 is released so as to permit the lock pin 65 to be urged back into an engaged orientation. In this regard some minor adjustments may be necessary to perfectly align the lock pin 65 with one of the plurality of notches 58 in the lock ring 50. Additionally, because the lock pin 65 is axially aligned along a radius of the overall assembly, and the notches 58 of the lock ring 50 are similarly aligned along a radius of the assembly, any load or crash impact forces exerted on the seat frame 80 which would normally tend to swivel the seat frame 80, will result in a shearing force focused on the lock pin 65. As a result, through the material strength of the lock pin 65, the lock pin 65 will be substantially strong so as to prevent the shearing force and prevent unwanted swivelling of the seat frame portion 80. This focused shearing effect is of particular importance so as to prevent the swiveling load exerted on the seat frame portion 80 to tend to pull the lock pin 65 from its engaged position. In fact, with the design of the present invention the lock means 60 would break prior to becoming dislodged such as through the counteraction of the force of the biasing spring 68. It is noted, that the assembly 10 of the present invention provides for much tighter and smoother rotation between the seat frame portion 80 and the seat base 90, permitting free and smooth swiveling and upon secured engagement in a particular orientation preventing instability between the seat frame portion 80 and the seat base 90. More importantly, however, is the swivel assembly 10 of the present invention ability to withstand substantial loads, such as those generally associated with FAA test guidelines, without disengaging.

While this invention has been shown and described in what is considered to be a practical and preferred embodiment, it is recognized that departures may be made within the spirit and scope of this invention which should, therefore, not be limited except as set forth in the claims which follow and within the doctrine of equivalents.

What is claimed is:

1. An aircraft passenger seat swivel assembly to be connected between an aircraft seat frame upon which an individual sits and an aircraft seat base which is secured to an underlying support surface, the seat base including a pair of transverse spar segments spanning a pair of base rails; said swivel assembly comprising:

a bottom swivel plate, said bottom swivel plate including a generally annular recess formed therein and an exterior lock flange, said bottom swivel plate being structured to be secured to the seat base, a bearing track, said bearing track including a generally annular configuration and being structured to be disposed in said annular recess of said bottom swivel plate, said bearing track further including a plurality of slots disposed about a perimeter thereof, a plurality of bearing members, said bearing members being rotatably disposed in said plurality of slots of said bearing track, a swivel plate, said swivel plate including a generally annular configuration and having an exterior segment about an exterior perimeter thereof and an interior mount segment in an interior thereof, said exterior segment of said swivel plate being structured to ride on said bearing members disposed in said slots of said bearing track, said interior mount segment of said swivel plate being structured to supportingly receive the aircraft seat frame thereon, a lock ring, said lock ring including an annular lock recess and an exterior lock flange, said lock ring being structured for secured engagement of said exterior lock flange of said lock ring with said exterior lock flange of said bottom swivel plate such that said bearing track, said plurality of bearing members and said exterior segment of said swivel plate are rotatably retained between said annular recess of said bottom swivel plate and said annular lock recess of said lock ring, said lock ring further including a plurality of axially oriented notches disposed in spaced apart relation from one another along an interior perimeter of said lock ring, and lock means disposed on said interior segment of said swivel plate, said lock means being structured and disposed to selectively and axially extend a lock pin into a select one of said notches in said interior perimeter of said lock ring so as to retain said swivel plate non-rotatably disposed relative to said lock ring, said bottom swivel and accordingly the seat base.

2. A swivel assembly as recited in claim 1 wherein said lock means includes a spring structured and disposed to normally bias said lock pin into an engaged position within one of said notches in said lock ring.

3. A swivel assembly as recited in claim 2 further including control means structured and disposed to retract said lock pin from said engaged position so as to permit relative rotation of said swivel plate.

4. A swivel assembly as recited in claim 1 wherein said notches are generally U-shaped and a width thereof corresponds a width of said lock pin.

5. A swivel assembly as recited in claim 1 further includes at least one upper bearing member disposed between said exterior segment of said swivel plate and said annular lock recess of said lock ring.

* * * * *